United States Patent
Fukuda et al.

(10) Patent No.: US 6,254,996 B1
(45) Date of Patent: Jul. 3, 2001

(54) ANTISTATIC POLYESTER FILM AND PROCESS FOR PRODUCING THE SAME

(75) Inventors: Masayuki Fukuda; Hideaki Watanabe, both of Sagamihara; Osamu Tanegashima; Kiyomi Ema, both of Funabashi, all of (JP)

(73) Assignees: Teijin Limited, Osaka; Nissan Chemical Industries, Ltd., Tokyo, both of (JP)

( * ) Notice: Subject to any disclaimer, the term of this patent is extended or adjusted under 35 U.S.C. 154(b) by 0 days.

(21) Appl. No.: 09/325,845

(22) Filed: Jun. 4, 1999

(30) Foreign Application Priority Data

Jun. 5, 1998 (JP) .................................................. 10-174130

(51) Int. Cl.⁷ .................................................... B32B 27/06
(52) U.S. Cl. ............................................................. 428/480
(58) Field of Search .............................. 524/410; 428/480

(56) References Cited

U.S. PATENT DOCUMENTS

| | | | |
|---|---|---|---|
| 5,229,260 | * 7/1993 | Takamuki | 430/527 |
| 5,334,292 | * 8/1994 | Rajeshwar | 204/59 |
| 5,340,676 | * 8/1994 | Anderson | 430/63 |
| 5,667,950 | * 9/1997 | Schmidt | 430/510 |
| 5,707,791 | * 1/1998 | Ito | 430/531 |
| 5,719,016 | * 2/1998 | Christian | 430/531 |
| 5,726,001 | * 3/1998 | Eichorst | 430/523 |
| 5,731,119 | * 3/1998 | Eichorst | 430/63 |
| 5,866,287 | * 2/1999 | Christian | 430/63 |
| 5,888,712 | * 3/1999 | Lelental | 430/528 |
| 5,928,848 | * 7/1999 | Nair | 430/510 |
| 5,939,243 | * 8/1999 | Eichorst | 430/530 |

FOREIGN PATENT DOCUMENTS

| | | |
|---|---|---|
| 1-313521 | 12/1989 | (JP) . |
| 3-255139 | 11/1991 | (JP) . |
| 4-28728 | 1/1992 | (JP) . |
| 4-288127 | 10/1992 | (JP) . |
| 5-170904 | 7/1993 | (JP) . |
| 5-320390 | 12/1993 | (JP) . |
| 6-76652 | 3/1994 | (JP) . |
| 6-172562 | 6/1994 | (JP) . |
| 6-219743 | 8/1994 | (JP) . |
| 6-287475 | 10/1994 | (JP) . |
| 7-90060 | 4/1995 | (JP) . |
| 7-144917 | 6/1995 | (JP) . |
| 9-12968 | 1/1997 | (JP) . |

* cited by examiner

Primary Examiner—Paul R. Michl
(74) Attorney, Agent, or Firm—Oliff & Berridge, PLC

(57) ABSTRACT

An antistatic polyester film having the excellent antistatic property and improved appearance of a coating layer, and a process for producing the same are disclosed. The antistatic polyester film comprises a polyester film having formed on at least one surface thereof an antistatic coating layer obtained by coating a coating liquid containing an organic-inorganic composite conductive sol (A) comprising colloidal particles of conductive oxide, having a primary particle size of 5 to 50 nm, and colloidal particles of a conductive polymer. This antistatic polyester film has excellent antistatic property, particularly excellent antistatic property under the low humidity environment, and therefore is useful in magnetic cards, magnetic disks, printing materials, graphic materials, photosensitive materials and the like.

10 Claims, No Drawings

ANTISTATIC POLYESTER FILM AND PROCESS FOR PRODUCING THE SAME

BACKGROUND OF THE INVENTION

1. Field of the Invention

The present invention relates to an antistatic polyester film and a process for producing the same. More particularly, the invention relates to an antistatic polyester film having excellent antistatic property under low humidity, thus having antistatic property substantially having no humidity dependency, which is useful in packaging materials, photographic materials, electronic materials, graphic materials, plate-making film, magnetic cards (for example, telephone cards and prepaid cards), OHP films, magnetic recording materials (for example, magnetic tapes such as audio tapes or video tapes, and magnetic disks such as floppy disks), printing materials, and the like, and a process for producing the same.

2. Descriptions of the Related Art

Polyester film are widely used in base films of, for example, packaging materials, photographic materials, magnetic cards, magnetic recording media and printing materials. However, as the common problems in plastic films, the polyester films have the disadvantages that static electricity tends to occur, and various troubles tend to occur in plate-making step, processing step and use of products.

As one of the methods for preventing the problems due to electrification of those films, various methods for forming an antistatic coating film on the surface of a film have been proposed and have been put in practical use. As antistatic agents to be contained in this antistatic coating film, electron-conductive materials represented by ion-conductive type of low- or high-molecular-weight organic materials, conductive metal oxides and conductive organic polymers have hitherto been known. However, those materials have advantages and disadvantages, respectively. Therefore, an appropriate antistatic agent is used depending on its purpose of use in view of the characteristic thereof.

For example, surface active agent type anionic antistatic agents such as long chain alkyl compounds having a sulfonate group (Japanese Patent Application Laid-open No. Hei 4-28728 (Hereinafter simply referred to as "JP-A")) are known as an antistatic agent of low molecular weight organic material. Further, polymers having Ionized nitrogen atom in the main chain (JP-A-3-255139, 4-288127 and 6-172562) and sulfonate-modited polystyrenes (JP-A-5-820890) are known as an antistatic agent of high molecular weight organic material.

However, antistatic coating layers using an ion-conductive type antistatic agent of low molecular weight organic material have the problems that a part of an antistatic agent moves in the coating layer to concentrate the same on an interface, and transfers to the opposite surface of the film, and the antistatic property deteriorates with the passage of time.

On the other hand, antistatic coating layers using an ion-conductive type antistatic agent of high molecular weight organic material require additions of an antistatic agent in high proportion in order to develop good antistatic property, and also require to form an antistatic coating layer having a large thickness, which are not economical. Further, in the case where the ion-conductive antistatic agent is used, its antistatic property depends on humidity, and the antistatic performance completely deactivates under dry condition.

On the other hand antistatic coating layers using an electron-conductive type antistatic agent represented by conductive metal oxides and conductive organic polymers also require the addition of an antistatic agent in the high Proportion in order to develop good antistatic property, and require to form an antistatic coating layer having a large thickness, which are not economical. Further, in the case where the conductive metal oxide is used alone, if an aromatic polyester film and the antistatic coating layer are subjected to, for example, stretching processing, a distance between mutual conductive oxide particles increases, so that an antistatic property lowers.

SUMMARY OF THE INVENTION

The present invention has been made to overcome the above-described problem in the prior art, and therefore has an object of the present invention to provide a polyester film having excellent antistatic property, particularly antistatic property under low humidity, and substantially having no humidity dependency.

Another object of the present invention is to Provide a process for producing the antistatic polyester film.

An antistatic polyester film of the present invention is characterized by comprising a polyester film having formed on at least one surface thereof an antistatic coating layer obtained by coating a coating liquid containing an organic-inorganic composite conductive sol (A) comprising colloidal particles of conductive oxide, having a primary particle size of 5 to 50 nm and colloidal particles of a conductive polymer.

A process for producing an antistatic polyester film of the present invention is characterized by coating an aqueous coating liquid containing an organic-inorganic composite conductive sol (A) comprising colloidal particles of conductive oxide and colloidal particles of a conductive polymer, on at least one surface of a polyester film, and then drying the coating.

Further, an antistatic polyester film is characterized by comprising a polyester film having formed on at least one surface thereof an organic-inorganic composite conductive coating layer comprising a conductive oxide having a primary particle size of 5 to 50 nm and a conductive polymer.

DETAILED DESCRIPTION OF THE PREFERRED EMBODIMENT

The present invention is described in detail below.

A polyester which constitutes the polyester film in the present invention is prepared from a dicarboxylic acid component and a glycol component.

Examples of the dicarboxylic acid component which is used in the present invention include terephthalic acid, isophthalic acid 2,6-naphthalenedicarboxylic acid, hexahydroterephthalic acid, 4,4'-diphenyldicarboxylic acid, adipic acid, sebacic acid, and dodecanedicarboxylic acid in particular, terephthalic acid and 2,6-naphthalenedicarboxylic acid are preferably used from the points of mechanical properties of the film.

Examples of the glycol component which is used in the present invention include ethylene glycol, diethylene glycol, propylene glycol, 1,3-propane diol, 1,4-butane diol, neopentyl glycol, 1,6-hexane diol, cyclohexane dimethanol, and polyethylene glycol. Ethylene glycol is particularly preferably used from the point of stiffness of the film.

The polyester my be a copolyester having as a third component the above-described dicarboxylic acid component or glycol component copolymerized therewith, or a polyester having a trifunctional or more polycarboxylic acid component or a polyol component copolymerized therewith in a small amount (for example, 5 mol % or less) such that a polyester obtained is substantially linear.

Such a polyester can be prepared by the conventional method. A polyester having an intrinsic viscosity of 0.45 or more is preferable in that mechanical properties of the film are improved such that the film has a large rigidity.

The polyester film can contain white pigments such as titanium oxide and/or barium sulfate. Further, if required and necessary, the polyester can also contain Inorganic fillers such as silicon oxide, aluminum oxide, magnesium oxide, calcium carbonate, kaolin and talc, organic fillers comprising heat resistant polymers such as crosslinked silicone resins, crosslinked polystyrene resins, crosslinked acrylic resins, urea resins or melamine resins, other resins such as polyethylene, polypropylene, ethylene/propylene copolymer or olefinic ionomer, stabilizers, antioxidants, ultraviolet absorbers, fluorescent whitening agents, and the like.

The polyester film is preferably a biaxially stretched film, and its thickness is 1 $\mu$m or more, preferably 4 to 500 $\mu$m, and more preferably 10 to 300 $\mu$m.

The antistatic coating layer formed on at least one surface of the polyester film is formed by coating a coating liquid containing an organic-inorganic composite conductive sol (A) comprising colloidal particles of conductive oxide, having a primary particle size of 5 to 50 nm and colloidal particles of a conductive polymer.

The colloidal particles of conductive oxide have a primary particle size of 5 to 50 nm. The "primary particle size" used herein does not mean a diameter of particles in an agglomerated state, but means a diameter of one particle separated individually. The primary particle size is determined by observation with an electron microscope.

Examples of the conductive oxide which is used in the present invention include antimony oxide-doped tin oxide, tin oxide-doped indium oxide, conductive zinc antimonate, conductive indium antimonate and conductive zinc oxide. Those materials are commercially available in the form of powder, aqueous sol or organic solvent sol . Further, if required and necessary, those conductive oxide powders can be wet pulverized in water or an organic solvent to prepare a sol , and such a sol can be used. For example, anhydrous zinc antimonate sol obtained by the method described in JP-A-6-219743 can be used. In particular, a conductive oxide aqueous sol which does not substantially contain ions is preferable. A conductive indium antimonate is described in, for example, JP-A-7-144917.

The colloidal particles of conductive polymer are preferably colloidal particles having a primary particle size of 2 to 10 nm. The "primary particle size" used herein does not man a diameter of particles in an agglomerated state, but means a diameter of one particle separated individually. The primary particle size is determined by observation with an electron microscope.

Examples of the conductive polymer which is used in the present invention include polyaniline, polyaniline derivatives polythiophene, polythiophene derivatives, polypyrrole, polyacetylene, polyparaphenylene and polyphenylene vinylene.

Exmples of a dopant which can be used include $Cl^-$, $Br^-$, $ClO_4^-$. paratoluenesulfonic acid, sulfonated polystyrene, polymethacrylic acid, and sulfonated polyvinyl alcohol. In general, conductive polymers containing a dopant are commercially available as the conductive polymer in the form of powder or dispersion, and those can be used. In the present invention, this conductive polymer containing a dopant is called a conductive polymer. The conductive polymer used in the present invention is preferably one having conductivity equal to or higher than that of the conductive oxides, and polythiophene or its derivatives are particularly preferable. The polyaniline and its derivatives are described in, for example, JP-A6- 287475, 5-170904, 5-171010 and 6-76652. Polythiophene and its derivatives are described in, for example, JP-A-1-318521, 7-90060 and 9-12968.

Where the conductive oxide sol and the conductive polymer colloid solution are used together, even if a mere mixture of the conductive oxide sol and the conductive polymer colloid solution is used, the conductive oxide and the conductive polymer behave separately, and as a result, a sufficient effect by the combined use thereof cannot be obtained. Therefore, in order to obtain a sufficient effect by using the conductive oxide sol and the colloidal particles of conductive polymer together, it is necessary to form a composite by mutual bonding or adsorption of the colloidal particles of conductive oxide and the colloidal particles of conductive polymer.

In the present invention, the composite formation of the conductive oxide sol (colloidal solution) and the conductive polymer colloidal solution is attained by covering the surface of the conductive oxide colloidal particles (monodispersed or small cluster state) with the conductive polymer colloidal particles.

To obtain the objective organic-inorganic composite conductive sol by stably mixing colloidal particles which agglomerate or gel, it is necessary to mix those under strong stirring in a concentration such that remarkable agglomeration does not occur.

Mixing and stirring are conducted using the conductive oxide sol having a concentration or 0.1 to 5% by weight and the conductive polymer colloidal solution having a concentration of 0.01 to 0.5% by weight at a temperature of 100° C. or less, and preferably at room temperature, for 0.1 to 5 hours under strong stirring.

The proportion of the conductive oxide sol and the conductive polymer colloidal solution is preferably 98/2 to 5/95 in the weight ratio of conductive oxide/conductive polymer. In the formation of a composite of the conductive oxide colloid and the conductive polymer colloid, by appropriately selecting the ratio of the conductive oxide and the conductive polymer so that the number of fine colloids of the conductive polymer is in excess, it is possible to exhibit good antistatic property even under the low concentration state, i.e., a state that the amount of hybrid colloids in the binder is small.

Mixing can be performed using a disper, a homogenizer, a mixer or a Satake type stirring device. A mixing device having a large shear force is preferable.

The antistatic coating layer used in the present invention preferably contains the above-described organic-inorganic composite conductive sol (A) and a binder resin (B) in order to make adhesion between the coating layer and the polyester film further strong.

Examples of the binder resin (B) used include polyester resin (B-1), acrylic resin (B-2) and acryl-modified polyester resin (B-3). It is preferable to use at least one kind of the resins selected from those resins. In particular, use of the polyester resin (B-1) or the acrylic resin (B-2) is preferable in that adhesion between the antistatic coating film and the polyester film is good, and the combined use of the polyester resin (B-1) and the acrylic resin (B-2) is preferable in that the adhesion is good and the coloration of a regenerated film can be suppressed in recovering and re-using the antistatic film. In the case where the polyester resin (B-1) and the acrylic resin (B-2) are used together, it is preferable to use the polyester resin (B-1) in an amount larger than that of the acrylic resin (B-2).

The polyester resin (B-1) Is a linear polyester comprising the dicarborylic acid component and the glycol component as the constituent components.

Examples of the dicarboxylic acid used include terephthalic acid, isophthilic acid, phthalic acid, 2,6-naphthalenedicarboxylic acid, 4,4-diphenyldicarboxylic acid, 1,4-cyclohexanedicarboxylic acid, adipic acid, sebacic acid, phenylindanedicarboxylic acid, and diner acid. Those components can be used in two kinds or more. Further, in combination with those components, unsaturated polybasic acids such as maleic acid, fumaric acid or itaconic acid, and hydronycarboxylic acids such as p-hydroxybenzoic acid or p-(β-hydroxyethoxy)benzoic acid can be used in the small proportion. The proportion of the unsaturated polybasic acid component or the hydroxycarboxylic acid component is at the most 10 mol %, and preferably 5 mol % or less.

Examples of the glycol component which can be used include ethylene glycol, 1,4-butane diol, neopentyl glycol, diethylene glycol, dipropylene glycol, 1,6-hexane diol, 1,4-cyclohexane dimethanol, xylylene glycol, dimethylolpropionic acid, glycerin, trimethylol propane, poly(ethyleneoxy) glycol, poly(tetramethyleneoxy)glycol, alkylene oxide adduct of bisphenol A, and alkylene oxide adduct of hydrogenated bisphenol A. Those can be used in two kinds or more.

Of those polyol components, ethylene glycol, ethylene oxide adduct or propylene oxide adduct of bisphenol A and 1,4-butane diol are preferable, and ethylene glycol and ethylene oxide adduct or propylene oxide adduct of bisphenol A are more preferable.

Further, it is possible to copolymerize a small amount of a compound having a sulfonate group or a compound having a carboxylate group with the copolyester resin in order to make aqueous liquefaction easy, and such is preferable.

Examples of the compound haying a sulfonate group preferably include alkali metal sulfonate type or amine sulfonate type compounds such as 5-Na sulfoisophthalic acid, 5-ammoniumsulfoisophthalic acid, 4-Na sulfoisophthalic acid, 4-ethylamoniumsulfoisophthalic acid, 2-Na sulfolsophthalic acid, 5-K sulfolsophthalic acid, 4-K sulfoisophthalic acid, 2-K sulfoisophthalic acid or Na sulfosuccinic acid.

Examples of the compound having a carboxylate group include trimellitic anhydride, trimellitic acid, pyromellitic anhydride, pyromellitic acid, trimesic acid, cyclobutanetetracarboxylic acid, dimthylolpropionic acid, or their monoalkali metal salts. Free carboxyl group is formed into a carboxylate group by acting an alkali metal compound or an amine compound thereto after copolymerization.

Examples of the acrylic resin (B-2) which can be used include acrylic acid, methyl acrylate, ethyl acrylate, butyl acrylate, sodium acrylate, ammonium acrylate, 2-hydroxyethyl acrylate, methacrylic acid, methyl methacrylate, ethyl methacrylate, butyl methacrylate, sodium methacrylate, ammonium methacrylate, 2-hydroxylethyl methacrylate, glycidyl methaerylate, acrylonitrile, acryl amide, methacryl amide, and N-methylol methacrylamide. Those monomers can be used in combination with, for example, other unsaturated monomers such as styrene, vinyl acetate, vinyl chloride, vinylidene chloride, divinylbenzene, sodium styrenesulfonate, sodium vinylsulfonate or sodium methallylsulfonate.

The acryl-modified polyester resin (B-3) is a graft copolymer prepared by polymerizing acrylic monomers such as acrylic acid, methyl acrylate, ethyl acrylate, butyl acrylate, sodium acrylate, aimonium acrylate, 2-hydroxyethyl acrylate, methacrylic acid, methyl methacrylate, ethyl methacrylate, butyl methacrylate, sodium methacrylate, ammonium methacrylate, 2-hydroxylethyl mothacrylate, glycidyl methacrylate, acrylonitrile, acryl amide methacryl amide, and N-methylol methacrylamide, in the presence of the above-described polyester resin (B-1). The acryl-modified polyester resin (B-3) may contain other unsaturated monomers such as styrene, vinyl acetate, vinyl chloride, vinylidene chloride, sodium divinylbenzene styrenesulfonate, sodium vinylsulfonate or sodium mthallylsulfonate, as a comonomer.

Binder resins other than the above can be compounded with the antistatic coating layer of the present invention in order to control the adhesion between the coating layer and the polyester film. Such other binder resins used include polyurethane resins, epoxy resins, vinyl resins, polyether resins and water-soluble resins.

A surface active agent (C) can be compounded with the antistatic coating layer of the present invention in order to make the adhesion between the coating layer and the polyester film strong and make blocking resistance of the antistatic film good. Examples of the surface active agent (C) used include nonionic surface active agents such as alkylene oxide homopolymers, alkylene oxide copolymers, aliphatic alcohol/alkylene oxide adducts, long chain aliphatic substituted phenol/alkylene oxide adducts, polyhydric alcohol aliphatic acid esters, or long chain aliphatic amide alcohols, and cationic or anionic surface active agents such as compounds having quaternary ammonium salt, compounds having alkyl pyridium salt, or compounds having sulfonate. In particular, nonionic surface active agents are preferable in that the adhesion between the coating layer and the base film and the effect to blocking resistance of the antistatic film are excellent.

The antistatic coating layer in the present invention is a coating layer containing the above-described organic-inorganic composite conductive sol (A), and is preferably a coating layer comprising a composition further containing the binder resin (B). The proportion of the organic-inorganic composite conductive sol (A) contained in the antistatic coating layer is preferably 5% by weight or more, and more preferably 10% by weight or more, to make the antistatic property good.

The antistatic coating layer in the present invention is that the conductive oxide colloid of the organic-inorganic composite conductive sol (A) is particles of conductive zinc antimonate, indium antimonate or their mixture, having a primary particle size of 5 to 50 nm, the conductive polymer colloid is particles of polythiophene or polythiophene derivatives, having a primary particle size of 10 nm or less, and the organic-inorganic composite sol (hybrid sol) of the conductive oxide and the conductive polymer has a particle size of 100 to 300 nm by the measurement with a laser scattering method. The proportion of the conductive oxide and the conductive polymer is 98/2 to 5/95 in the weight ratio of conductive oxide/conductive polymer, the binder resin (B) is a polyester resin having a secondary transition point of 20 to 100° C., and a coating liquid containing a composition comprising 10 to 80% by weight of the organic-inorganic composite conductive sol (A), 20 to 80% by weight of the binder resin (B) and 0 to 25% by weight of the surface active agent (C) is coated to form the antistatic coating layer. This embodiment is particularly preferable in that the adhesion between the coating layer and the base film blocking resistance of the antistatic film, the heat resistance, and the antistatic property under low humidity are excellent.

In the proportion of each component of (A) to (C) above to be compounded with the coating liquid, if the amount of the organic-inorganic composite conductive sol (A) is in the range of 5 to 95% by weight and the amount of the binder resin (B) is in the range of 5 to 95% by weight, the antistatic property and the adhesion between the coating layer and the polyester film become good. If the surface active agent (C) is further used, the adhesion between the coating layer and the polyester film and the blocking resistance become good. The amount of the surface active agent (C) used preferably is in the range of 1 to 25% by weight based on the total weight of the components (A) to (C).

The proportion of the organic-inorganic composite conductive sol (A) used in the antistatic coating layer is preferably 98/2 to 5/95 in conductive oxide/conductive polymer weight ratio. In forming a composite of the conductive oxide and the conductive polymer, by appropriately selecting the ratio of the conductive oxide and the conductive polymer so that the number of fine colloids of the conductive polymer is in excess, it is possible to exhibit good antistatic property even under a low concentration state, i.e., a state that the amount of hybrid colloids in a binder resin is small.

The coating liquid in the Present invention is preferably coated as a coating liquid in which water is used as a medium, but it is possible to coat the same as a coating liquid in which an organic solvent is used as a medium. Examples of the organic solvent used include methyl ethyl ketone, acetone, ethyl acetate, tetrahydrofuran, dioxane, cyclohexanons, n-hexane, toluene, xylene, methanol, ethanol, n-propanol and isopropanol. Those solvents can be used alone or as mixtures thereof.

The coating liquid in the present Invention may contain a wetting agent in order to improve the wettability to the polyester film Further, other additives such as ultraviolet absorbers, pigments, lubricants, blocking preventives, crosslinking agents such as melamine, epoxy or aziridine, and other antistatic agents can be compounded with the coating liquid in the range that the object of the present invention is not impaired.

It is generally preferable that the solid content concentration of the coating liquid in the present invention is 0.5 to 30% by weight.

In the present invention, the (primer) solution containing each above-described component is coated on at least one surface of the polyester film. The polyester film is preferably a polyester film before completion of crystal orientation. Examples of the polyester file prior to the completion of crystal orientation include unstretched film obtained by heat melting the polyester and then directly forming a film-like material, uniaxially stretched film obtained by orienting an unstretched film in either of a vertical direction or a longitudinal direction, and a film obtained by stretching and orienting in two directions of a vertical direction and a longitudinal direction (biaxially stretched film prior to completion of orientation crystallization by finally re-stretching in a vertical direction and a longitudinal direction).

Conventional and optional coating methods can be applied to the coating method of the coating liquid to the polyester film. The methods include roll coating method, gravure coating method, microgravure coating method, reverse coating method, roll brush method, spray coating method, air knife coating method, dipping method and curtain coating method. Those methods may be used alone or in combination thereof.

The coating amount is 2 to 50 g, and preferably 8 to 40 g, per 1 $m^2$ of a running film. The thickness of the finally dried coating layer (coating) is 0.02 to 2 $\mu$m, and preferably 0.05 to 1 $\mu$m. If the coating thickness is less than 0.02 $\mu$m, the antistatic property is insufficient, and an the other hand, if it exceeds 2 $\mu$m, sliding property decreases or blocking resistance lacks, which is not preferable. The coating liquid can be applied to only one surface or both surfaces of a film depending on the use purpose of the film. After coating, the coating is dried to form a uniform coating layer.

In the present invention, after coating the coating liquid on the polyester film, drying and, preferably stretching treatment, are conducted. The drying is preferably conducted at 90 to 130° C. for 2 to 20 seconds. This drying can also serve as a pre-heat treatment in the stretching treatment or a heat treatment in stretching. The stretching treatment of the polyester film is preferably conducted at a temperature of 70 to 140° C. with a stretching ratio of 25 to 7 times in the vertical direction and 2.5 to 7 times in the longitudinal direction and with an area magnification of 8 times or more, and preferably 9 to 28 times. In the case of re-stretching, it is preferable to stretch at a stretching ratio of 1.05 to 3 times (the area magnification is the saw as above). Heat fixation treatment after stretching is preferably conducted at a temperature higher than the final stretching temperature but lower than the melting point for 1 to 30 seconds. For example, in a polyethylene terephthalate film and a polyethylene-2,6-naphthalate film, it is preferable to conduct heat fixation at 170 to 240° C. for 2 to 30 seconds.

According to the present invention, the antistatic polyester film comprising a polyester film having formed an at least one surface thereof the organic-inorganic composite conductive film comprising the conductive oxide having a primary particle size of 5 to 50 nm and the conductive polymer is obtained by the above method.

EXAMPLES

The present invention is described in more detail by the following examples, but the invention is not limited to those examples. Evaluation in the present invention was conducted with the following methods.

Adhesion

Adhesive Force of Magnetic Paint:

A paint for evaluation is coated on a coated surface of a sample polyester film with a Mayer bar at a dry thickness of about 4 $\mu$m, and the resulting coating is dried at 100° C. for 3 minutes. The resulting coating layer is aged at 60° C. for 24 hours, and Scotch tape No. 600 (a product of 3M) having a width of 12.7 mm and a length of 15 cm is adhered thereon in the manner such that air bubbles do not enter the adhered interface. A manual type load roll as defined in JIS-C2701 (1975) is applied on the tape to adhere the same to the coating layer. The coating layer having adhered thereon the tape is cut with the tape width. A force when the cut piece is peeled at an angle of 180° is measured.

Paint for Evaluation:
In terms of a solid content:

| | |
|---|---|
| 1) Urethane resin, Nipporan 2304 (a product of Nippon Polyurethane Co.) | 25 parts |
| 2) vinyl chloride/vinyl acetate resin Eslex A (a product of Sekisui Chemical Co.) | 50 parts |
| 3) Dispersing agent, Resion P (a product of Riken Vitamin Co.) | 1 part |
| 4) Magnetic agent, CTX-860 (a product of Toda Kagaku K.K.) | 500 parts |

The above components are dissolved in a methyl ethyl ketone/toluene/cyclohexanone mixed solvent to prepare a 40% solution, and the resulting solution is dispersed with a sand grinder for 2 hours. 25 Parts (in terms of a solid content) of an isocyanate (Coronate L, a product of Nippon Polyurethane Co.) as a crosslinking agent are added to the solution, and well stirred to obtain a magnetic paint.

Adhesive Force of UV Ink:

A polyester film having a thickness of 250 μm is adhered on an uncovered area of a sample with an adhesive. An ultraviolet curable printing ink (Plash dry FDO BENI APN, a product of Tokyo Ink) is printed on a primer-covered area with RI tester (a product of Akira Seisakusho). Curing is conducted with UV cure apparatus of a middle pressure mercury lamp (80 W/cm, one lamp system, a product of Japan Battery Co.) to form an UV ink layer having a thickness of 3.0 μm Cellotape (18 mm width; a product of Nichiban Co.) was adhered on this UV ink layer in a length of 15 cm, and a constant load is applied on this tape with a 2 kg manual type load roll. The film is fixed and one edge of the Cellophane tape is peeled at a direction of 90°, thereby evaluating a peel adhesive force. The adhesion is evaluated on the basis of the following 5 grades.

5: Ink layer does not peel at all.
4: Less than 3% of ink layer peels.
3: 3 to 10% of ink layer peels.
2: 10 to 30% of ink layer peels.
1: 30% or more of ink layer peels.

The Appearance of the Coating Layer of Primer Coated Film

The appearance of the coating layer of a primer coated film is visually judged The coating layer in which its coating surface is uniform and does not have defect is marked O, and the coating layer in which Its coating surface has spotting or cissing defect is marked X.

Antistatic Property

The antistatic property is evaluated with a surface resistivity of a sample film. That is, a surface resistivity (Ω/□) after 1 minute of applied voltage of 500 V is measured under the conditions of measurement temperature of 23° C., and measurement humidity of 40% and 0% using a surface resistivity measuring device, manufactured by Takeda Riken Co., and evaluated. Under the present conditions, $1 \times 10^{10}$ (Ω/□) or less is preferable.

The Preparation of the Orgnic-Inorganic Composite Conductive sol (A)

Anhydrous zinc antimonate aqueous sol was obtained by the method described in JP-A-6-219743. A particle size calculated from a specific surface by THE BET METHOD of a dried product of the anhydrous zinc antimonate sol and a primary particle size by observation with a transmission type electron microscope was 15 nm. 432.5 g of this anhydrous zinc antimonate sol was diluted with pure water to 1731 g, and a solution prepared by diluting 250 g of polythiophene colloidal solution (Baytron P, a product of Bayer AG., concentration 1.3%) with pure water to 1810 g was added thereto under stirring with a disper. After the addition, the resulting solution was further stirred with a disper for 1.5 hours. As a result of observation with a transmission electron microscope, it was observed that Baytron P formed particles agglomerated in a spherical shape of 10 to 100 nm, agglomerates of fibrous particles having a minor axis of 2 to 5 nm and a major axis of 50 to 100 nm, and agglomerates of particles having indefinite shape and a size of several nm. From the quantitative standpoint, it was confirmed that agglomerates of particles having a primary particle size of 2 to 10 nm were large. This organic-inorganic composite sol was concentrated up to 735 g using a rotary evaporator. The organic-inorganic composite conductive sol (A) obtained has a conductive oxide/conductive polymer weight ratio of 94.2/5.8, and a concentration of 7.3% by weight. The organic-inorganic composite conductive sol had a size of 157 nm by the measurement with a particle size distribution measuring device by a laser scattering method.

Example 1

A composition comprising 99.5% by weight of polyethylene terephthalate having an intrinsic viscosity of 0.65 and 0.5% by weight of silicon oxide having a particle size of 0.2 μm was melted, cast on a cooling drum, and stretched at a stretching ratio of 3.6 times in a longitudinal direction.

A 10 wt % aqueous solution having a composition comprising 65% by weight of a copolyester (B-1) (Tg=80° C., average molecular weight=20,500) prepared from terephthalic acid (11 mol %), isophthalic acid (1 mol %), 2,6-naphthalenedicarboxylic acid (69 mol %), 4,4'-diphenyldicarboxylic acid (11 mol %), 5-sulfoisophthalic acid (8 mol %), ethylene glycol (73 mol %), 1,4-cycloaexane dimethanol (12 mol %) and a propylene oxide adduct (15 mol %) of bisphenol A represented by the following structural formula:

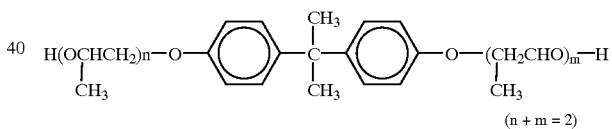

(n + m = 2)

30% by weight of the organic-inorganic composite conductive sol (A-1) obtained above, and 5% by weight of Poly (n=9)oxyethylene nonylphenyl ether (C-1) as a surface active agent was coated on both surfaces of the film obtained above in an amount of 4 g/m² (wet) with a microgravure coating method.

After drying, the film was stretched at a stretching ratio of 3.6 times in a vertical direction, and then heat treated at 230° C. to obtain a biaxially stretched polyester film having covered thereon a coating layer having a thickness of 50 μm.

The coated appearance, the adhesive force of the magnetic paint, the adhesive force of UV ink and the antistatic property (surface inherent resistivity), of the treated surface of this film are shown in Table 1.

Example 2

A coating layer-covered biaxially stretched polyester film was obtained in the same manner as in Example 1 except that a solution having a composition comprising 75% by weight of (B-1) used in Example 1, 18% by weight of the organic-inorganic composite conductive sol (A-1) and 7% by weight of poly(n=9)oxyethylene nonylphenyl ether (C-1) as a surface activating agent was used.

The coated appearance, the adhesive force of the magnetic paint, the adhesive force of UE ink and the antistatic property (surface inherent resistivity), of the treated surface of this film are shown in Table 1.

Example 3

A coating layer-covered biaxially stretched polyester film was obtained in the same manner as in Example 1 except that (B-1) used in Example 1 was changed into an acrylic copolymer (B-2) (number average molecular weight: 248,000) prepared from methyl methacrylate, ethyl acrylate, 2-hydroxyethyl methacrylate and N-methylol methacrylamide.

The coated appearance, the adhesive force of the magnetic paint, the adhesive force of UV ink and the antistatic property (surface inherent resistivity), of the treated surface of this film are shown in Table 1.

Example 4

A coating layer-covered biaxially stretched polyester film was obtained in the same manner as in Example 1 except that 65% by weight of (B-1) used in Example 1 was changed into 85% by weight of (B-1) and 30% by weight of (B-2) used in Example 3.

The coated appearance, the adhesive force of the magnetic paint, the adhesive force of UV ink and the antistatic property (surface inherent resistivity). of the treated surface of this film are shown in Table 1.

Example 5

A coating layer-covered biaxially stretched polyester film was obtained in the same manner as in Example 1 except that 65% by weight of (B-1) used in Example 1 was changed into 65% by weight of an acryl-modified polyester (B-3) obtained by conducting emulsion polymerization of the (B-2) composition used in Example 3 in an aqueous medium of the copolyester (B-1).

The coated appearance, the adhesive force of the magnetic paint, the adhesive force of UV ink and the antistatic property (surface inherent resistivity), of the treated surface of this film are shown in Table 1.

Example 6

A coating layer-covered biaxially stretched polyester film was obtained in the same miner as in Example 1 except that the conductive oxide/conductive polymer weight ratio in the organic-inorganic composite sol used in Example 1 was changed into 91.5/8.5 (A-2).

The coated appearance, the adhesive force of the magnetic paint, the adhesive force of UV ink and the antistatic property (surface inherent resistivity), of the treated surface of this film are shown in Table 1.

Example 7

A coating layer-covered biaxially stretched polyester film was obtained in the same manner as in Example 1 except that the conductive oxide/conductive polymer weight ratio in the organic-inorganic composite sol (A) used in Example 1 was changed into 80/20 (A-3).

The coated appearance, the adhesive force of the magnetic paint, the adhesive force of UV ink and the antistatic property (surface inherent resistivity), of the treated surface of this film are shown in Table 1.

Example 8

A coating layer-covered biaxially stretched polyester film was obtained in the same manner as in Example 1 except that the conductive oxide/conductive polymer weight ratio in the organic-inorganic composite sol (A) used in Example 1 was changed into 50/50 (A-4).

The coated appearance, the adhesive force of the magnetic paint, the adhesive force of LV ink and the antistatic property (surface inherent resistivity), of the treated surface of this film are shown in Table 1.

Example 9

A coating layer-covered biaxially stretched polyester film was obtained in the same manner as in Example 1 except that the conductive oxide/conductive polymer weight ratio in the organic-inorganic composite sol (A) used in Example 1 was changed into 20/80 (A-5).

The coated appearance, the adhesive force of the magnetic paint, the adhesive force of UV ink and the antistatic property (surface inherent resistivity), of the treated surface of this film are shown in Table 1.

Example 10

A composition comprising 99.5% by weight of polyethylene terephthalate having an intrinsic viscosity of 0.65 and 0.5% by weight of silicon oxide having a particle size of 0.2 $\mu$m was melted, cast on a cooling drum, and stretched at a stretching ratio of 3.6 times in a longitudinal direction and then stretched at a stretching ratio of 3.6 times in a vertical direction. The stretched film was heat treated at 230° C. to obtain a biaxially stretched polyester film having a thickness of 75 $\mu$m. The 8 wt % aqueous solution as used in Example 1 was coated on one surface of the file obtained above with a reverse gravure coating method in an amount of 2 g/m$^2$ (wet) to obtain a coating layer-covered biaxially stretched polyester film.

The coated appearance, the adhesive force of the magnetic paint, the adhesive force of UV ink and the antistatic property (surface inherent resistivity), of the treated surface of this film are shown in Table 1.

Comparative Example 1

A coating layer-covered biaxially stretched polyester film was obtained in the same manner as in Example 1 except that the organic-inorganic composite conductive sol (A-1) used in Example 1 was changed into sodium dodecylbenzene sulfonate (A-8).

The coated appearance, the adhesive force of the magnetic paint, the adhesive force of UV ink and the antistatic property (surface inherent resistivity), of the treated surface of this film are shown in Table 1.

Comparative Example 2

A coating layer-covered biazially stretched polyester film was obtained in the same manner as in Example 1 except that the organic-inorganic composite conductive sol (A-1) used in Example 1 was changed into sodium polystyrene sulfonate (A-9).

The coated appearance, the adhesive force of the magnetic paint, the adhesive force of UV ink and the antistatic property (surface inherent resistivity), of the treated surface of this film are shown in Table 1.

Comparative Example 3

A biaxially stretched polyester film was obtained in Example 1 without coating the composition The coated appearance, the adhesive force of the magnetic paint, the adhesive force of UV ink and the antistatic property (surface inherent resistivity), of the treated surface of this film are shown in Table 1.

TABLE 1

| Example No. or Comparative example No. | ap- pearance of coating film | Adhesive force of magnetic paint (g/0.5" width) | Adhesive force of UV ink | Surface inherent resistivity ($\Omega/\square$), 20° C. | |
|---|---|---|---|---|---|
| | | | | 40% RH | 0% RH |
| Example No. | | | | | |
| 1 | ○ | 42 | 5 | $5 \times 10^9$ | $3 \times 10^{10}$ |
| 2 | ○ | 37 | 5 | $4 \times 10^8$ | $2 \times 10^{10}$ |
| 3 | ○ | 39 | 5 | $1 \times 10^{10}$ | $3 \times 10^{10}$ |
| 4 | ○ | 36 | 5 | $9 \times 10^9$ | $5 \times 10^{10}$ |
| 5 | ○ | 39 | 5 | $7 \times 10^9$ | $2 \times 10^{15}$ |
| 6 | ○ | 38 | 5 | $3 \times 10^8$ | $4 \times 10^9$ |
| 7 | ○ | 36 | 5 | $9 \times 10^8$ | $5 \times 10^{10}$ |
| 8 | ○ | 39 | 5 | $7 \times 10^9$ | $2 \times 10^{10}$ |
| 9 | ○ | 38 | 5 | $3 \times 10^8$ | $4 \times 10^9$ |
| 10 | ○ | 38 | 5 | $3 \times 10^8$ | $4 \times 10^8$ |
| Comparative example No. | | | | | |
| (1) | ○ | 39 | 5 | $3 \times 10^{11}$ | $>10^{15}$ |
| (2) | ○ | 30 | 2 | $3 \times 10^{12}$ | $>10^{15}$ |
| (3) | ○ | 7 | 1 | $>10^{15}$ | $>10^{15}$ |

Effects of the Present Invention

The present invention provides an antistatic polyester film comprising a polyester film having formed on at least one surface thereof an antistatic coating layer obtained by coating a coating liquid containing an organic-inorganic composite conductive sol (A) comprising colloidal particles of conductive oxide, having a primary particle size of 5 to 50 nm and colloidal particles of a conductive polymer. This antistatic polyester film has excellent antistatic property, particularly excellent antistatic property under the low humidity environment, and therefore is useful in magnetic cards, magnetic disks, printing materials, graphic materials, photosensitive materials and the like.

What is claimed is:

1. An antistatic polyester film comprising a polyester film having formed on at least one surface thereof an antistatic coating layer obtained by coating a coating liquid containing an organic-inorganic composite conductive sol (A) comprising colloidal particles of conductive oxide, having a primary particle size of 5 to 50 nm, and colloidal particles of a conductive polymer.

2. The antistatic polyester film according to claim 1, wherein the polyester film is polyethylene terephthalate.

3. The antistatic polyester film according to claim 1, wherein the polyester film is polyethylene-2,6-naphthalate.

4. The antistatic polyester film according to claim 1, wherein the conductive oxide is conductive zinc antimonate, indium antimonate or a mixture thereof.

5. The antistatic polyester film according to claim 1, wherein the colloidal particle of the conductive polymer has a primary particle size of 2 to 10 nm.

6. The antistatic polyester film according to claim 1, wherein the conductive polymer is polythiophene or polythiophene derivatives.

7. The antistatic polyester film according to claim 1, wherein the proportion of the conductive oxide and the conductive polymer is 98/2 to 5/95 in the conductive oxide/conductive polymer weight ratio.

8. The antistatic polyester film according to claim 1, wherein the coating liquid has a composition comprising 5 to 95% by weight of the organic-inorganic composite conductive sol (A), and 5 to 95% by weight of at least one binder resin (B) selected from the group consisting of a polyester resin (B-1), an acrylic resin (B-2) and an acryl-modified Polyester resin (B-3).

9. A process for producing an antistatic polyester film, which comprises coating an aqueous coating liquid containing an organic-inorganic composite conductive sol (A) comprising colloidal particles of conductive oxide, having a primary particle size of 5 to 50 nm, and colloidal particles of a conductive polymer, on at least one surface of a polyester film, and then drying the coating.

10. An antistatic polyester film comprising a polyester file having formed on at least one surface thereof an organic-inorganic composite conductive coating layer comprising a conductive oxide having a primary particle size of 5 to 50 nm and a conductive polymer.

* * * * *